(12) United States Patent
Harris (10) Patent No.: US 7,544,287 B2
(45) Date of Patent: Jun. 9, 2009

(54) RECIPROCATING BIOLOGICAL CONTACTOR AND METHOD OF USE

(75) Inventor: Andrew Paul Harris, Gloucester (CA)

(73) Assignee: Seprotech Systems Incorporated, Ottawa, Ontario (CA)

(*) Notice: Subject to any disclaimer, the term of this patent is extended or adjusted under 35 U.S.C. 154(b) by 0 days.

(21) Appl. No.: 11/752,564

(22) Filed: May 23, 2007

(65) Prior Publication Data

US 2008/0023387 A1 Jan. 31, 2008

Related U.S. Application Data

(60) Provisional application No. 60/803,066, filed on May 24, 2006.

(51) Int. Cl.
*C02F 3/08* (2006.01)
(52) U.S. Cl. .................. 210/150; 210/209; 210/615
(58) Field of Classification Search ................ 210/150, 210/151, 615, 619, 209; 435/299.1
See application file for complete search history.

(56) References Cited

U.S. PATENT DOCUMENTS

| | | | | | |
|---|---|---|---|---|---|
| 3,617,541 | A | * | 11/1971 | Pan ............................ | 210/615 |
| 4,093,539 | A | * | 6/1978 | Guarino ...................... | 210/619 |
| 4,177,147 | A | * | 12/1979 | Roberts ...................... | 210/151 |
| 4,421,648 | A | * | 12/1983 | Besik ......................... | 210/151 |
| 5,326,459 | A | * | 7/1994 | Hlavach et al. ............. | 210/150 |
| 6,245,236 | B1 | * | 6/2001 | Schenck ..................... | 210/615 |
| 6,322,056 | B1 | * | 11/2001 | Drie ............................ | 261/81 |
| 6,406,624 | B1 | * | 6/2002 | DeVos ........................ | 210/208 |
| 2004/0149651 | A1 | * | 8/2004 | Ruppel ....................... | 210/150 |
| 2005/0201202 | A1 | * | 9/2005 | Drie ........................... | 210/150 |

\* cited by examiner

*Primary Examiner*—Christopher Upton
(74) *Attorney, Agent, or Firm*—David J. French (57) ABSTRACT

A bioreactor vessel has a biological support provided within the vessel to support bacteria and a drive system for agitating the biological support while it is it is immersed in the reaction liquor that is to be treated within the vessel. The drive system causes the biological support to oscillate with a reciprocating or rectilinear motion and the drive system is preferably located either outside the vessel or within a portion of the vessel that is above the level of reaction liquor present therein.

20 Claims, 5 Drawing Sheets

RECIPROCATING BIOLOGICAL CONTACTOR AND METHOD OF USE

This application claims the benefit of priority from U.S. Provisional Patent Application 60/803,066, filed 24 May 2006.

FIELD OF THE INVENTION

This invention relates to the treatment of fluids through biological reaction. More particularly, it describes an apparatus for that includes a support system for microorganisms and a method for enhancing the performance of such apparatus by agitating the support system for microorganisms.

BACKGROUND OF THE INVENTION

Wastewater is typically treated in order to remove undesirable contents and provide an effluent that can safely be returned to the environment. Bacteria can assist in this process, particularly in respect of breaking-down ammonia that may be present in the wastewater. The biological reaction by which ammonia is removed involves the conversion, first, aerobically, of the ammonia and other nitrogen-containing compounds to nitrates through bacterial nitrification; followed by the second step in which anoxic bacterial denitrification converts the nitrates into nitrogen gas which is then separated from the wastewater.

Anoxic bacteria require an oxygen-free, or relatively oxygen-free environment in which to thrive. Accordingly, the anoxic treatment of reaction liquor is carried out in a container that minimizes the exposure of the bacteria to oxygen. This is achieved by providing a reactor in which a reaction liquor can be treated by submerging the bacteria in the reaction liquor and possibly but not necessarily by having a mechanical seal preventing the air outside the reaction liquor reactor from penetrating into the reaction liquor contained within the reactor.

In recent years, biochemical reactors have been configured to accommodate biofilms. The term "biofilm" as used herein may be defined as a layer of a biomass on a substrate. Microorganisms within a biofilm thrive and are more reactive when they are in direct contact with the liquor that supplies such bacteria with nutrients. In the context of the present invention, when used in an anoxic biological contactor, the bacteria of the anoxic type have an affinity to the carrier material of the substrate. Through use of an appropriate substrate, the bacteria maintained within the reactor and may be highly concentrated. Biodegradation within such a biochemical reactor generally proceeds on the basis of a flow of influent containing nitrites and/or nitrates over the biofilm and the rate of reaction is proportional to the quantity of bacteria exposed. In a biofilm system, as microorganisms grow on fixed surfaces of their supporting substrate, the biofilm grows in thickness as the microorganisms multiply. Eventually part of the biofilm will detach from the substrate as the bacteria lose their vitality and new biofilm will be formed in place on the substrate. The reactivity of such systems can be improved by increasing the rate at which less active and dead bacteria are sloughed-off the supporting substrate.

Past biofilm reactors have incorporated rotating biological contactor support surfaces which serve to accelerate this regeneration process. Some patents, which are directed to the use of anoxic biological contactors, include the following:
U.S. Pat. No. 6,676,836 patented Jan. 13, 2004 by M.G. Mandt;
U.S. Pat. No. 6,620,322 patented Sep. 16, 2003 by Smith & Vessio LLC;
U.S. Pat. No. 6,413,427 patented Jul. 2, 2002 by Ecokasa Inc.;
U.S. Pat. No. 5,702,604 patented Dec. 30 1997 by Yamasaki et al;
Of the many patents which relate to the above subject matter are the following:
U.S. Pat. No. 5,908,555 patented Jun. 1, 1999 by Hydrometrics Inc;
U.S. Pat. No. 5,811,259 patented Sep. 22, 1998 by EcoMat Inc;
U.S. Pat. No. 5,395,528 patented Mar. 7, 1995 by Lyonnaise des Eaux-Dumez S.A.;
U.S. Pat. No. 5,073,256 patented Dec. 17, 1991 by Norddeutsche Seekabelwerke; and
U.S. Pat. No. 4,126,545 patented Nov. 21, 1978 by Research Corporation;

Some known types of biological reactors employ backwashing of the biofilm support surfaces at regular intervals in order to remove the excess biomass that accumulates. These reactors proceed, therefore, in a discontinuous manner, constituting a disadvantage of this known process. In order to avoid the complete shutdown of the bioreactor during the frequent, necessary washing of the contactors, several contactors were sometimes provided, of which alternately one contactor is always in operation, while the other contactor was being backwashed. Apart from the necessary duplication of equipment required by this procedure, the unit in the operation experiences declining performance as caking progressively occurs within the biofilm prior to the back washed cycle.

Prior biological treatment processes also rely on circulating and recirculating the reaction liquor over the biofilm substrates. In cases where the bacteria tend to multiply rapidly a tendency may develop for the bacteria to fill-up the spaces between the biofilm substrate. This can cause an increase in the hydraulic resistance to the flow of the reaction liquor and, at times, result in the mechanical plugging of certain portions of the space between biofilm substrates. As a result, the flow of reaction liquor within the bioreactor decreases, which, in turn reduced the liquor flux across the bacteria. The overall efficiency of the contactor is thereby decreased. It is known that maintaining a thin biofilm of relatively constant thickness on the support substrate is also essential for optimal operation of such a system.

A further disadvantage of prior art contactors is that the drive systems provided by the prior art are typically substantially in contact with the corrosive reaction liquor. The "drive system" includes the basic actuator, e.g. a motor or hydraulic cylinder, and the linkages that extend between such actuator and the biological supports within the reactor. The immersion of any articulated components within the reaction liquor can expose the drive system to damage caused to the corrosive action of the reaction liquor.

The above-described constraints and problems associated with conventional bioreactors have created a need for a solution. Bearing in mind the problems and deficiencies of the prior art, it would therefore be desirable to provide an improved biological contactor.

It would also be desirable to be able to provide a media drive system that is protected from the corrosive effects the reaction liquor and is easily accessible for maintenance.

The invention in its general form will first be described, and then its implementation in terms of specific embodiments will be detailed with reference to the drawings following hereafter. These embodiments are intended to demonstrate the principle of the invention, and the manner of its implementation.

The invention in its broadest sense and more specific forms will then be further described, and defined, in each of the individual claims which conclude this Specification.

SUMMARY OF THE INVENTION

This invention is based on the recognition that a reciprocating or oscillating motion and/or shaking of the substrate upon which the bacteria grows results in the creation of a shearing force which enhances the sloughing-off of ineffective bacteria from the biofilm. The sloughing-off of bacteria by this mechanism serves to prevent excessive bacteria growth on the substrate and to maximize the prospect that healthy bacteria are in contact with the reaction liquor to carry out the desired biological reaction.

The anoxic biological contactor (hereinafter ABC) of one aspect of the present invention may be generally described as an oscillating biofilm contactor. In one embodiment, it includes a tank having at least one reaction liquor inlet and at least one reacted water outlet. A bacterial support assembly or "support" is provided which provides a substrate in the form of multiple substrate surfaces for the bacteria to grow upon. A drive system, preferably exterior to the liquid volume, is provided such that it may drive the substrate surfaces so that they carry out a reciprocating or oscillating motion within the reaction liquor environment. A linkage may be provided between the actuator portion of the drive system and the support. When the drive system is actuated, the reciprocating motion of the substrate surfaces within the reaction liquor creates a shearing force which sloughs-off bacteria. This serves to prevent excessive bacteria growth on the substrate and to maximize the prospect that healthy bacteria are in contact with the reaction liquor, enhancing the efficiency of the biological reaction.

Two prior patents which disclose a type of reciprocation for a wastewater treatment process are the following:

U.S. Pat. No. 6,245,236 patented Jun. 12, 2001 by Cercona of America Inc; and

U.S. Pat. No. 5,863,433 patented Jan. 26, 1999 by Tennessee Valley Authority United States Corp.

However, neither of these two patents addresses imparting a to-and-fro movement of bacteria loaded substrate submerged within an anoxic biological contactor.

The supports carrying the bacteria preferably comprise a series of substrate members, formed e.g., of plastic mesh, upon which the bacteria grow and are attached. Ideally but not necessarily, the substrate has a high ratio of surface area to volume, in order to provide a high area on which a biofilm may form in a limited volume. According to one feature of the invention, the biofilm supporting substrates are permeable to the flow of reaction liquor, allowing such reaction liquor passed through the supporting substrates at a controlled rate that will allow time for the biological reaction to occur. According to a further embodiment, the reaction liquor passing through the reactor is preferably caused to flow, at least in part, in a sinuous path that passes in contact with the consecutive surfaces of the supports carrying the bacteria.

According to a further aspect of the invention, the reactor may be insulated to minimize heat loss and can be located in the ground where the ground will serve as a natural insulator.

According to a further aspect of the present invention, an anoxic biological contactor (ABC) is provided that includes with a slideably-mounted support assembly to permit a plurality of spaced-apart substrates to be agitated as a unit. Though a bioreactor with one main chamber is possible and useful, in order to enhance the efficiency of the system, the reactor may be divided into two or more compartments or subchambers, each having a substrate support assembly that may be dependently or independently actuated from the other substrate supports. The reaction liquor being processed flows consecutively through such subchambers.

According to a further feature of the invention, all of the actuated components of the drive system are located outside of volume occupied by the reaction liquor. A portion of each support assembly extends upwardly from the maximum height of the surface of the reaction liquor to be contained within the reactor for coupling to the drive system. Preferably, substantially no actuated components of the drive system extend below the height of the surface. The drive system may include components which are partially or entirely present within the reactor but outside the reaction liquor volume. Thus the prime actuator, e.g. the motor or hydraulic cylinder, may optionally be located within the reactor.

According to the invention, a method is provided by which a volume of reaction liquor to be treated by exposure to anoxic bacteria or other types of microorganisms is effected by supporting the bacteria in the form of a biofilm on a supporting substrate that is agitated within the volume of the reaction liquor. Preferably, the substrate is agitated with a substantially rectilinear reciprocal motion which maintains the biofilm within the volume of the reaction liquor. According to a further feature of a method of the invention, the reaction liquor is moved through one or more compartments wherein such reaction liquor is treated by exposure to biofilms carried on reciprocated supports.

In another aspect of the invention, the bioreactor of the invention may function as an aerobic or anaerobic reactor. A chemical inlet in the form of an easily accessed opening which may be a one-way valve may be provided through which chemicals may be injected into the reactor body to prevent a chemical deficiency from halting the bioreaction process. Appropriate monitoring devices may be provided in order to ensure that the levels of chemicals within the reactor vessel are within desired ranges.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

The preferred embodiment of this invention describes a wastewater treatment apparatus. Specifically, it describes an anoxic reactor through which wastewater which has previously been nitrified may be denitrified. It is not intended that this embodiment be limiting, as other anoxic, anaerobic and aerobic processes in which a microorganism is provided with a reciprocating biofilm support in order to encourage a biological reaction through the apparatus described in this document are intended to fall within the disclosure of the invention.

Figure 1:
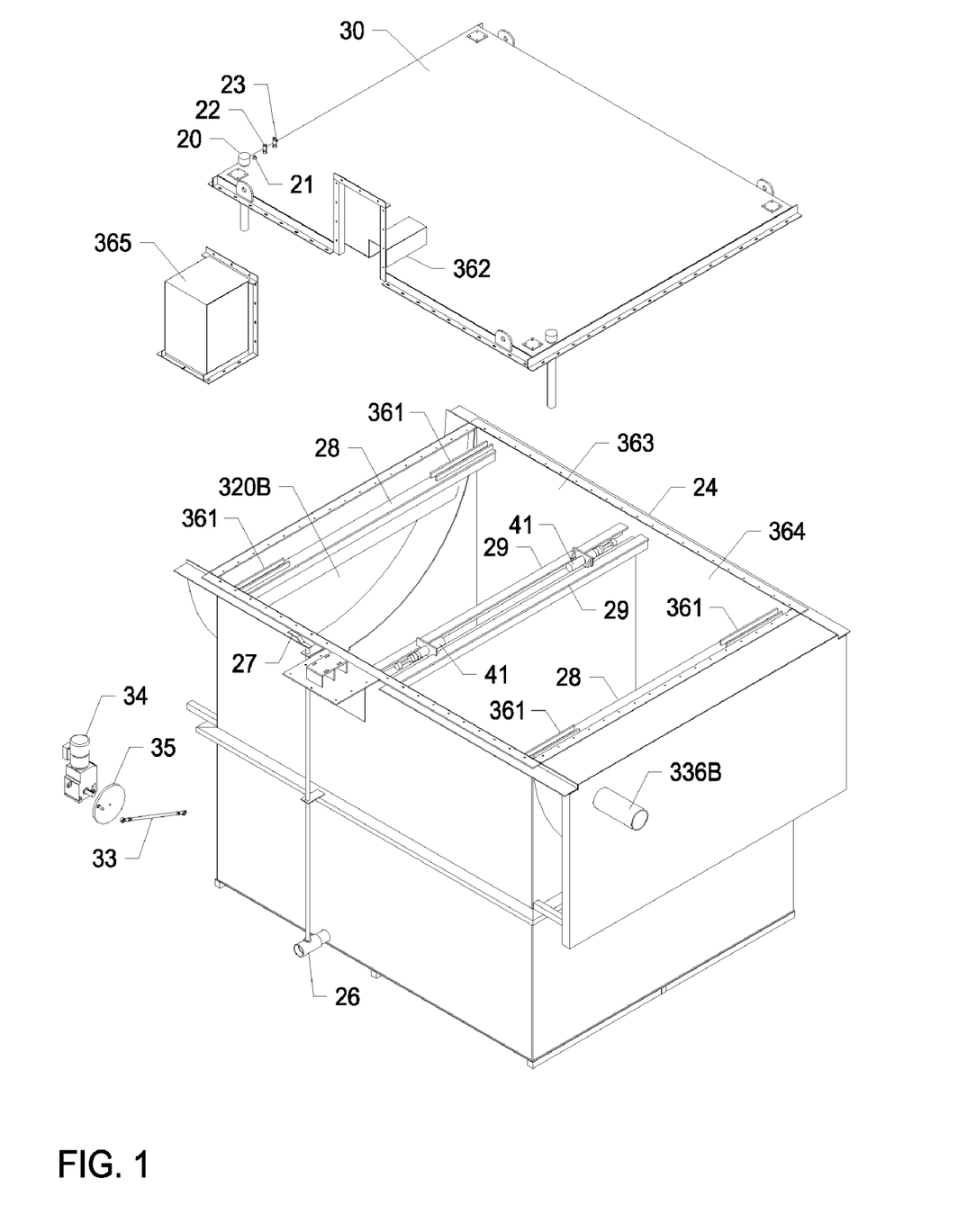
FIG. 1 depicts a pictorial exploded assembly drawing of a two-compartment biological reactor with a cover for said reactor and showing an exploded view of the motor with an eccentric arm connected to a circular plate that moves in a reciprocating, sinusoidal-like path to impart a corresponding oscillating displacement to the carrying frames.
Figure 4:
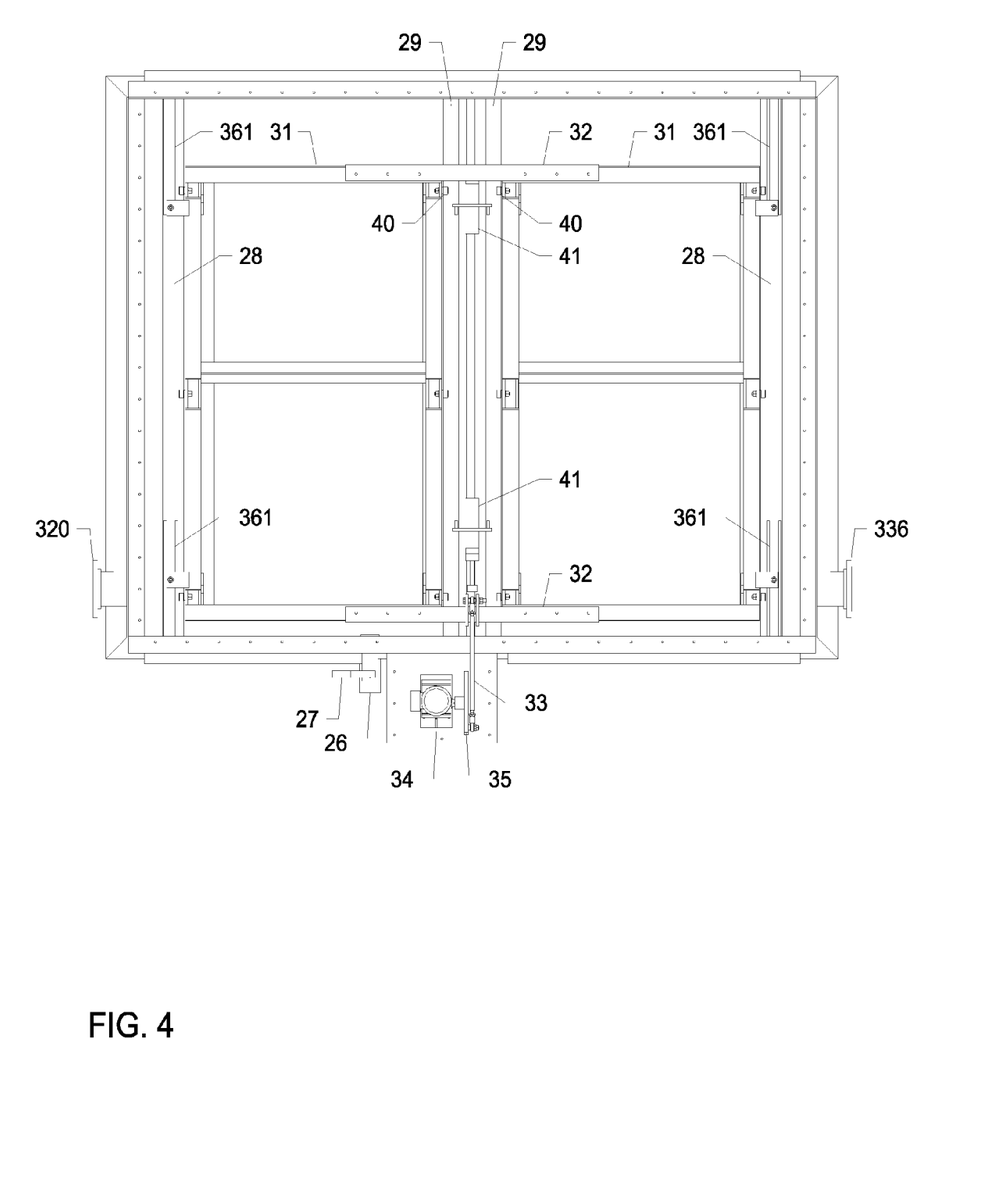
FIG. 4 is a top view of the assembled bioreactor similar to the bioreactor of FIG. 1 with the cover removed, showing an alternative inlet and outlet from those shown in FIGS. 1 and 2.
Figure 5:
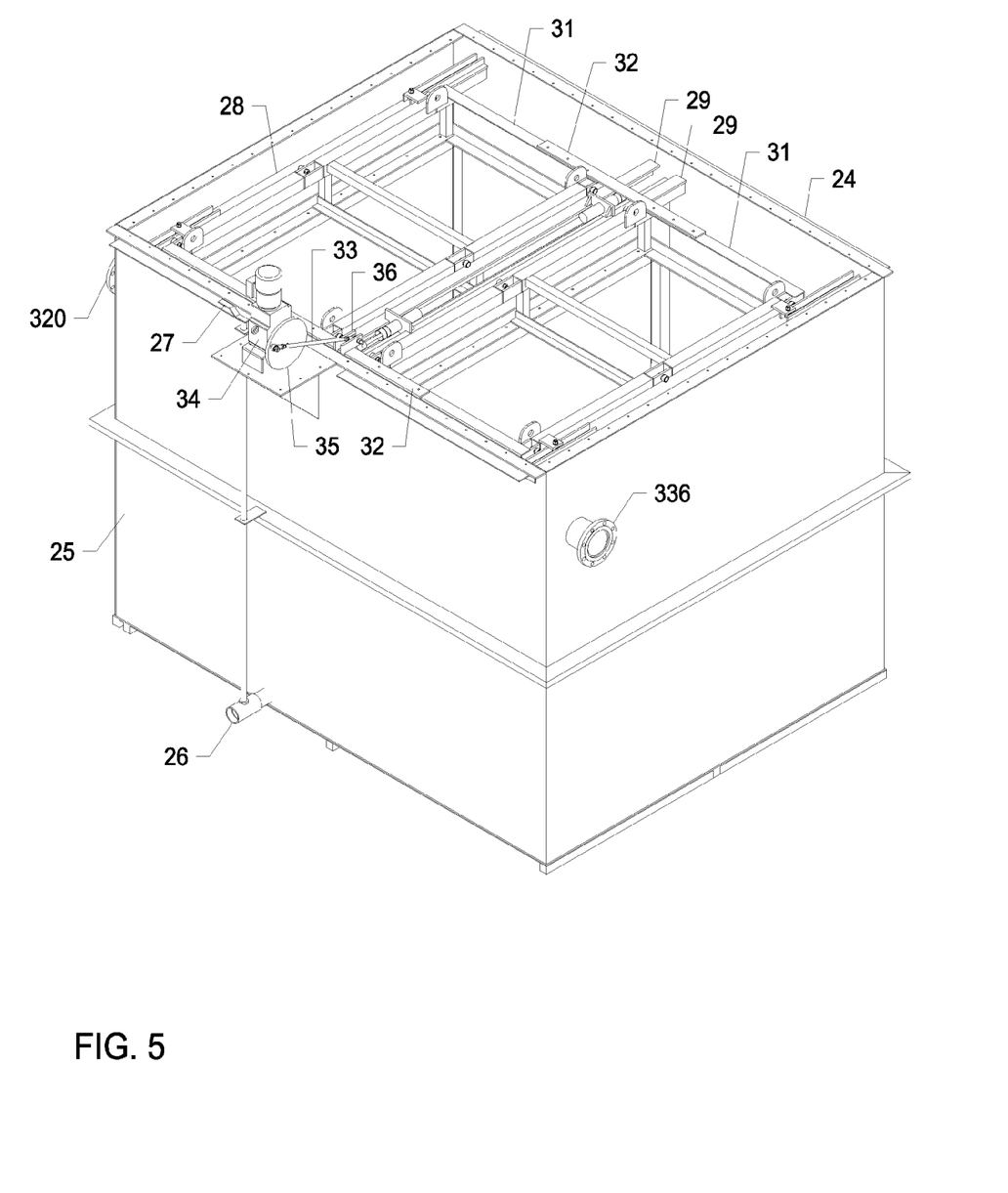
FIG. 5 is an isometric view of the assembled media reactor of FIG. 4 with the cover removed.

FIG. 1 depicts a two-compartment biological reactor 24 having at least one reaction liquor inlet 320B and at least one reacted water outlet 336B. An alternate embodiment of the reaction water inlet 320 and outlet 336 is depicted in FIGS. 4 and 5. The reaction water inlet 320B is in this embodiment a large, semicircular inlet with a diameter substantially similar to the width to the wall of the biological reactor 24 with which it is positioned upon. The reaction liquor being processed flows consecutively through such subchambers, passing from the first compartment 363 to the second compartment 364.

Figure 2:
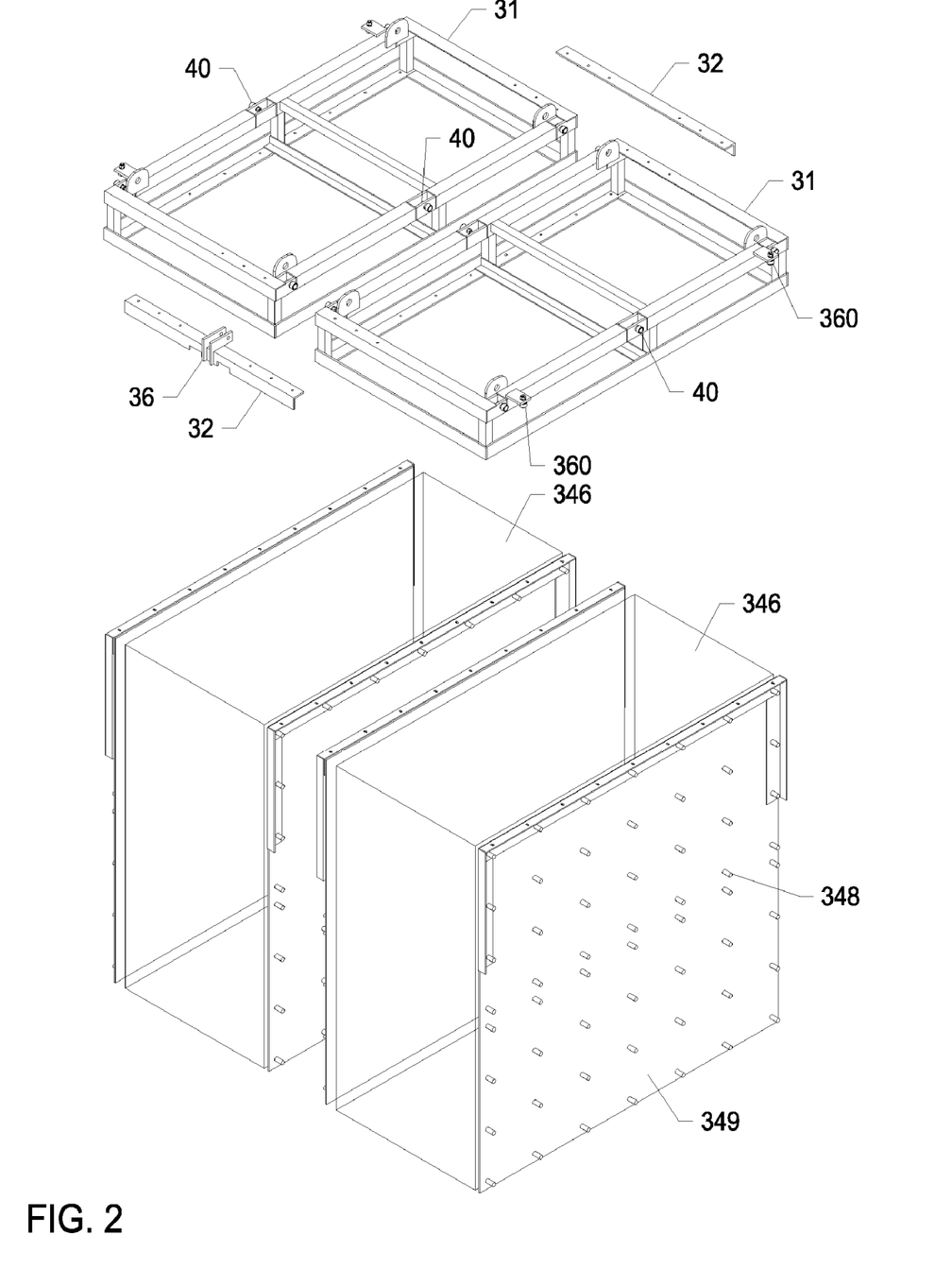
FIG. 2 depicts in similar exploded form, the two carrying frames which support the bacterial support assemblies and said bacterial support assemblies.

FIG. 2 depicts two bacterial support assemblies 346 in an exploded, preassembly location above the reactor 24 prior to being lowered into the internal volume of the reactor 24. Each of the support assemblies 346 provides a biofilm substrate for the bacteria to grow upon. While the bacterial support assemblies 346 are depicted as a single, box-like member, each bacterial support assembly 346 is comprised of a number of individual, vertically oriented, parallel bacteria support members (not individually shown). All of these individual substrate members move as a unit when the bacterial support assemblies 346 are agitated. The bacterial support assemblies are "sandwiched" between two parallel solid plates 349.

These individual bacteria support members are formed of a suitable plastic plate of e.g., polypropylene, which are perforated, mesh-like, corrugated, or otherwise provided of a construction which causes them to have a preferably large surface area to volume ratio. Each biological support substrate 346 includes a plurality (for example, in one type of anoxic bioreactor, 70) of parallel plastic members which are separated from one another, e.g., by spacer cylinders and are held together by tie rods 348. Each pack of biological support substrates 346 thus provides a plurality of channels (not seen) through which reaction liquor is channeled to flow in intimate contact with the bacteria with which it is to be reacted.

The multiple parallel substrate members are intended to be immersed in the reaction liquor that is to be contained within the reactor 24. This reaction liquor occupies a treatment volume within the reactor 24, which volume has as its upper surface the upper surface of the reaction liquor. Above the reaction liquor is a volume that will accumulate the gas being evolved by the bacteriological action occurring within the reactor.

Also depicted, in similar exploded form, are the (optional) cover 30 for the reactor 24 and the two carrying frames 31 that are mounted respectively onto each of the support assemblies 346. A portion of each individual bacterial support member within each bacterial support assembly 346 extends upwardly from the maximum height of the surface of the reaction liquor to be contained within the reactor for connection to a respective carrying frame 31.

The two individual carrying frames 31 are connected to each other through a pair of frame connecting members 32, such frame connecting members 32 being placed on opposite sides of the carrying frames 31. Said individual carrying frames 31 are placed within the volume of the reactor 24 and preferably placed above the level of the reaction liquor to be contained therein. These frames 31, and with them the bacterial support assemblies 346, are caused to move in unison when a force is applied to frame connecting member 32.

Additionally depicted are a pair of centrally located, horizontal frame carrying members 29 and two laterally located frame carrying members 28. Each of these frame carrying members 28, 29 are located above the reaction liquor volume for supporting the carrying frames 31 as they are agitated and along which said carrying frames 31 may slide. The frame carrying members 28, 29 extend from one sidewall of the reactor vessel 24 to the other sidewall of the reactor vessel 24.

The carrying frames 31 are provided with a plurality of guide wheels 360 fitted to move within guide rails 361 positioned upon the lateral frame carrying members 28. The motion of the guide wheels 360 within the guide rails 361 serves to restrict the movement of the carrying frames 31 to a single horizontal axis.

The carrying frames 31 are preferably provided with friction-reducing rollers 40 which are rested on the frame carrying members 28, 29. The carrying frames are then caused to slide, to-and-fro, along the frame carrying members 28, 29. It is additionally possible that the rollers are provided on the frame carrying members 28, 29 and that the carrying frames 31 are rested on the rollers 40. Although rollers 40 are mentioned in this embodiment, it is certainly possible that such friction-reducing means be provided in the form of linear bearings, track rollers, and any other friction-reducing means which would reduce the friction between the carrying frames 31 and frame carrying members 28, 29.

The cover 30 to the reactor 24 includes an access opening 362 which extends into the volume above the carrying frames 31 and allows a linkage 33 to extend between one of such frame connecting members 32 and a motor 34 contained within a sealed box 363 attached to the reactor cover 30.

FIG. 1 shows a exploded view of the motor 34 wherein a linkage 33 in the form of an eccentric arm is driven by a rotating circular plate 35 that drives the linkage 33 in a reciprocating, sinusoidal-like path to impart a corresponding oscillating displacement to the drive linkage member 36 provided on one of the frame connecting members 32, and accordingly to impart this oscillating displacement to the carrying frames 31 and the bacterial support assemblies 346 mounted thereon. The motor 34, circular plate 35, and linkage 33 serve as the drive system and are located exterior to the liquid volume to be occupied by the reaction liquor. When the drive system is actuated, the reciprocating motion of the bacterial support assemblies 346 within the reaction liquor creates a shearing force which sloughs-off bacteria which grows on such bacterial support assemblies. This serves to prevent excessive bacterial growth on the bacterial support assemblies 346 and to maximize the prospect that healthy bacteria are in contact with the bacterial support assemblies 346, enhancing the efficiency of the biological reaction.

The drive system preferably but not necessarily drives the bacterial support assemblies 346 such that a graph of the velocity of the bacterial support assemblies 346 versus time would show a generally sinusoidal shape. By smoothly changing the velocity of the relatively heavy bacterial support assemblies 346, strain on the drive system and associated parts may be reduced, which can reduce the need for more expensive components and which can reduce maintenance costs. By changing the velocity smoothly, it can also be ensured that the agitation of the bacterial support assemblies 346 does not remove too much bacteria from said assemblies 346.

It may alternatively be desirable to quickly move the bacterial support assemblies 346 at a fixed speed in one direction and to quickly halt the motion of the bacterial support assemblies 346 before beginning their motion in the return direction through the use of a double hydraulic ram or other appropriate mechanism, especially if it is desired to exert a high "impact force" on the bacterial support assemblies 346 and the associated biofilm.

While a motor 34 is shown as the prime actuator for oscillating the support assemblies 346, any other suitable mechanism may be employed. This may include an air actuated or hydraulically actuated cylinder system. It may also include a cam-and-follower drive system or any other drive system that produces a to-and-fro movement.

Hydraulic dampers 41 are provided between the carrying frames 31 and the outer sidewalls of the reactor 24, along the central frame carrying members 29. These dampers 41 act to dampen the motion of the bacterial support system consisting of the carrying frames 31 and bacterial support assembly 346, and to reduce the strain on the drive system. Such dampers 41 could be provided in other forms, such as pneumatic or coiled springs, among other devices which can serve to dampen the motion of an object.

As shown in FIG. 2, the bacterial support assemblies 346 carrying the bacteria preferably comprise a series of substrate plates which are enclosed on their front and rear ends by solid plates 349. The bacterial support assemblies 346 are partially permeable to the flow of reaction liquor throughout the space between the individual bacterial supports, allowing such reaction liquor passed through the bacterial support assemblies 346 to pass in a sinuous flow at a controlled rate that will allow time for the biological reaction to occur. This sinuous flow is in the horizontal direction.

It will be seen that by passing the reaction liquor through the apparatus as described above, a method is provided by which the reaction liquor is treated by exposure to an anoxic bacteria in the form of a biofilm carried on a bacterial support assembly 346 that is agitated within the volume of the reaction liquor. As depicted, the bacterial support assembly 346 is agitated with a reciprocal motion which maintains a constant thickness of active bacteria upon the individual support members. Further, in the preferred embodiment, reaction liquor is moved through one or more consecutive compartments wherein such reaction liquor is treated by exposure to bacteria carried on reciprocated bacterial support assemblies 346.

The reactor vessel 24 is provided with a tubular opening 26 which is provided with a valve that may be opened by actuating the valve-control member 27 in order to drain the tank. An injection port 21 may be provided in order to allow the injection of necessary chemicals in order to support the biological processes taking place in the reactor 24. A one-way valve 22 is provided in order to allow gasses evolved through the treatment of the reaction liquor to escape from the reactor 24 without allowing an undesirable gas, i.e. oxygen, to enter the reactor 24. Additionally, a fluid sampling port 20 and atmosphere sampling port 23 may be provided in order to allow measurements of the state of the reaction liquor to be made.

Figure 3:
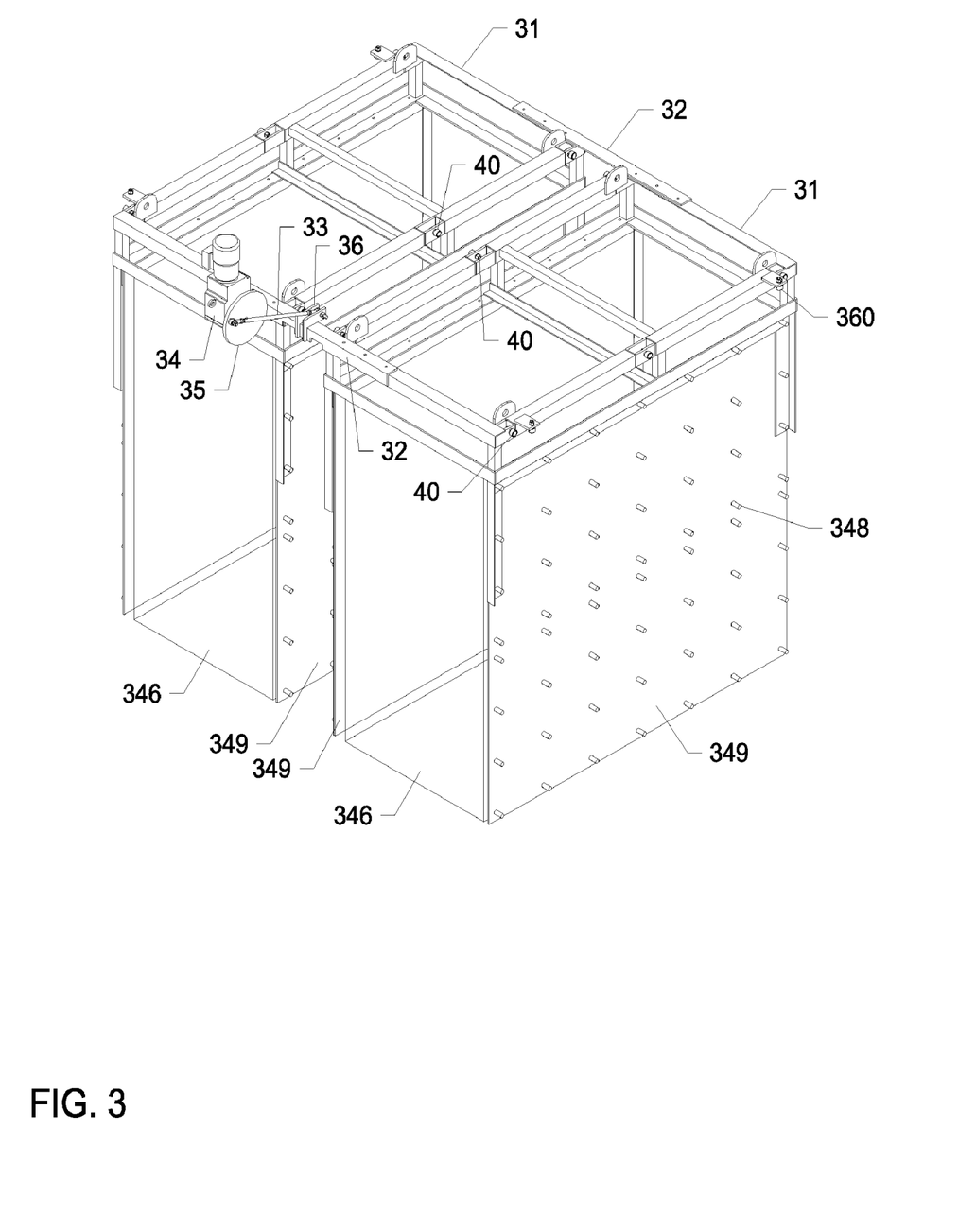
FIG. 3 is an isometric view of the substrate plates, carrying frames, and associated drive system of FIG. 1 with the cover and reactor body removed.

FIGS. 3, 4 and 5 depict the manner in which the parts of the reactor 24 depicted in FIGS. 1 and 2 are assembled.

It may, in some cases, be advantageous to actuate the drive system of the invention only for a limited amount of time in each day instead of constantly. Actuating the drive system for, for example, 10 minutes an hour would allow the system to slough-off a portion of the bacterial growth while conserving energy that would otherwise be expended by oscillating the plates nonstop. This may have the additional advantage of ensuring that oxygen which may have leaked into the gas volume above the reaction liquor is not mixed into the liquor, as such a mixture may upset the anoxic environment required for an anoxic process to take place.

In one embodiment of the invention, wastewater which has previously been nitrified is injected into the inlet 320. This wastewater typically but not necessarily contains naturally-occurring nutrients for the denitrifying bacteria. Other desired nutrients may be injected into the reaction liquor through the injection port 21. This wastewater flows through the reactor, passing substantially through the bacterial support assemblies 346 which are being reciprocated by the drive system as previously described and contacting the biofilm supported thereon. By contacting the bacteria in the reactor and preferably the healthy denitrifying bacteria which is located on the bacterial support assemblies 346, the nitrates in the wastewater are substantially removed from the wastewater. The nitrates are evolved into nitrogen gas which is then allowed to escape from the reactor body through the one-way valve 22. In this embodiment, two anoxic reactor compartments are provided, but any number of such compartments may be provided as required to denitrify the wastewater which is to be injected into the inlet 320. After the water has passed through the reactor of the invention, it becomes substantially nitrate free before being ejected through the outlet port 336.

In the foregoing disclosure, an anoxic reactor is described. This is one application of the invention. However, the invention also extends to any form of biological reactor, anoxic or otherwise, wherein the immersed portion of the biological support submerged in reaction liquor is agitated with a reciprocating motion. It would be possible, for example, to use the reactor of the invention to effect Biological Oxygen Demand (BOD) removal through an anaerobic process. Other examples of alternative processes which would benefit from the apparatus of the invention would include a predenitrification process and a gas collecting process. Such a reactor would typically be located prior to an aerobic reactor and would be partially fed with reaction products recycled from said aerobic reactor.

CONCLUSION

The foregoing has constituted a description of specific embodiments showing how the invention may be applied and put into use. These embodiments are only exemplary. The invention in its broadest, and more specific aspects is further described and defined in the claims which follow. These claims, and the language used therein are to be understood in terms of the variants of the invention which have been described. They are not to be restricted to such variants, but are to be read as covering the full scope of the invention as is implicit within the invention and the disclosure that has been provided herein.

The invention claimed is:

1. A biological reactor vessel comprising:
   1) a tank having an inlet and an outlet and a treatment volume for receiving and delivering a liquid to be treated;
   2) an assembly of media substrate having a biofilm support surface, said media substrate being positioned within the treatment volume within the tank to serve as a biological support to carry a biofilm to be contacted by the liquid to be treated;
   3) a drive system for agitating the biological support while said assembly of media substrate is located at least partially inside the treatment volume;
   wherein the drive system causes the assembly of media substrate to oscillate with a reciprocating motion having a predominant component that is in the horizontal direction while at least a portion of the media substrate remains continuously immersed within the treatment volume so as to expose the immersed biofilm to a reciprocating shearing force directed alternately in opposite horizontal directions along the biofilm support surface, such shearing force arising from the differential motion of the media substrate with respect to the liquid to be treated.

2. A biological reactor vessel as in claim 1 wherein guide means are provided which guide the motion of the assembly of media substrate in a horizontal direction as said assembly of media substrate is agitated by the drive system.

3. A biological reactor vessel as in claim 2 wherein the guide means are one or more rails which support the assembly of media substrate.

4. A biological reactor vessel as in claim 3 wherein the rails guide the media substrate in a substantially rectilinear motion.

5. A biological reactor vessel as in claim 3 wherein friction reducing means to reduce the friction between the guide means and the assembly of media substrate is provided in the form of rollers mounted on the assembly of media substrate, said rollers supporting the assembly of media substrate on the rails in order to reduce the friction between the assembly of media substrate and the rails.

6. A biological reactor vessel as in claim 2 wherein friction-reducing means are provided to reduce the friction between the guide means and the assembly of media substrate.

7. A biological reactor vessel as in claim 2 wherein the guide means are located exterior to the treatment volume within the tank.

8. A biological reactor vessel as in claim 2 wherein the reactor is anoxic or anaerobic.

9. A biological reactor vessel as in claim 1, subdivided into multiple interconnected chambers, with multiple biological supports respectively contained within each such chamber, there being a fluid flow conduit between adjacent chambers for allowing for multiple stages of treatment of reaction liquor to be contained therein.

10. A biological reactor vessel as in claim 1 wherein the chive system is located exterior to the treatment volume within the reactor.

11. A biological reactor vessel as in claim 1, wherein the reactor vessel is sealed so as to provide a separation between the internal atmosphere of the reactor vessel and the atmosphere exterior to the reactor vessel so as to exclude air from contacting the surface of the liquid hence allowing treatment of the liquid under anoxic or anaerobic conditions.

12. A biological reactor vessel as in claim 11 wherein the reaction vessel includes a valve that allows gas evolved within the reactor vessel to escape from the reactor without allowing air to enter the reactor.

13. A biological reactor vessel as in claim 1, comprising feed means for effecting chemical or nutrient injection into the treatment volume to support a biological or chemical process for treatment of the liquid under an anoxic or anaerobic conditions, such chemical or nutrient excluding air or oxygen.

14. A biological reactor vessel as in claim 1 wherein the drive system produces a smooth velocity curve in the driven assembly of media substrate.

15. A biological reactor vessel as in claim 1 wherein the drive system includes a rotating drive wheel and connecting rod, and wherein the connecting rod drives the assembly of media substrate.

16. A biological reactor vessel as in claim 15 wherein the rotational motion of the drive wheel imparts a generally rectilinear motion to the assembly of media substrate.

17. A biological reactor vessel as in claim 16 wherein the motion of the biological support is decelerated at least partially through the use of dampeners.

18. A biological reactor vessel as in claim 17 wherein the dampeners are chosen from the list comprised of pneumatic pistons and hydraulic pistons.

19. A biological reactor vessel as in claim 1 wherein the drive system comprises a cam and follower.

20. A biological reactor vessel as in claim 1 wherein the reactor is anoxic or anaerobic.

* * * * *